United States Patent
Free

[11] 3,883,798
[45] May 13, 1975

[54] FREE FLOW RESONANT CAVITY MEASURING APPARATUS

[75] Inventor: John Marshall Free, Montclair, N.J.

[73] Assignee: Hoffmann-La Roche Inc., Nutley, N.J.

[22] Filed: Apr. 19, 1974

[21] Appl. No.: 462,467

Related U.S. Application Data

[63] Continuation of Ser. No. 250,301, May 4, 1972, abandoned.

[52] U.S. Cl. .......................... 324/58.5 C; 333/81 B
[51] Int. Cl. ............................................. G01r 27/04
[58] Field of Search ..... 324/58.5 R, 58.5 A, 58.5 B, 324/58.5 C; 333/81 B

[56] References Cited
UNITED STATES PATENTS

| | | | |
|---|---|---|---|
| 2,548,598 | 4/1951 | Feiker, Jr. | 324/58.5 C |
| 2,736,867 | 2/1956 | Montgomery | 333/81 B |
| 2,792,548 | 5/1957 | Hershberger | 324/58.5 C |

FOREIGN PATENTS OR APPLICATIONS

| | | | |
|---|---|---|---|
| 1,122,987 | 8/1968 | United Kingdom | 324/58.5 A |

Primary Examiner—Stanley T. Krawczewicz
Attorney, Agent, or Firm—Samuel L. Welt; Bernard S. Leon; Mark L. Hopkins

[57] ABSTRACT

A system adapted for monitoring and/or processing a continuous flowing medium by the use of microwave techniques comprising a rectangular wave guide arrangement including a resonant cavity with end pipe units, one at each end of the resonant cavity and turned 90° with respect to the axis of the resonant cavity so as to be cross-polarized. This in-effect defines a common feed path through which the medium is continuously fed. A feed system is designed to provide a uniform movement of the medium through the resonant cavity to ensure that the resonant cavity is continuously maintained at full capacity for providing uniformity in measurement.

8 Claims, 4 Drawing Figures

3,883,798

FREE FLOW RESONANT CAVITY MEASURING APPARATUS

This is a continuation, of application Ser. No. 250,301 filed May 4, 1972 now abandoned.

DESCRIPTION OF THE PRIOR ART

The application of microwave energy to products for monitoring (e.g., measuring) and/or processing (e.g., drying or sterilization) purposes, has been found to be an extremely useful tool. As an example of one advantage for microwave drying, the microwaves seek the wetter parts of the product so that in essence the energy "homes" in on the wet sections and consequently one obtains an evenly dried product whereas in conventional drying everything is heated regardless of the needs. However, none of the techniques, as presently known, utilize a continuous feed operation which includes a resonant cavity which is highly desirable in those instances where an extremely effective drying operation is desired.

Similarly, there is instrumentation on the market for measuring the temperature and/or humidity of a product. For example, in continuous feed operations, e.g., with a continuous web of paper, transducers are placed at each side of the paper for transmitting and receiving a high frequency signal to ascertain humidity percentage and other parameters. In instances where a greater accuracy is desired e.g., to measure moisture percentage below 1 percent, batch measurements are made with resonant cavities. However, these lack the advantage of a continuous feed operation and thus become quite impracticable and cumbersome.

SUMMARY OF THE PRESENT INVENTION

The main object of the present invention is the application of microwave energy to a product or medium: for monitoring purposes where a high degree of sensitivity and accuracy are desired or; for processing purposes to increase the uniformity and efficiency of the operation. This is accomplished by employment of a resonant cavity of rectangular configuration in which the elements used for electrically closing the resonant cavity opposing ends, are a pair of wave guide like pipes similar in dimension to the resonant cavity but rotated 90° with respect thereto, to provide for a continuous feed path having ease of entry and egress for the medium with respect to the resonant cavity unit. Feed means provided at the entrance of one end pipe and at the exit of the second end pipe, are designed to ensure that the resonant cavity unit is continuously filled with a medium to be monitored and/or processed to obviate any air gaps which may affect microwave propagation in the resonant cavity.

To enhance the ease of flow of the medium inside the resonant cavity and end pipes, slabs are provided to essentially define a continuous feed path of uniform dimensions and obviate any mechanical irregularities while preserving the essential microwave characteristics of the structure.

DESCRIPTION OF THE PREFERRED EMBODIMENT

Figure 1:
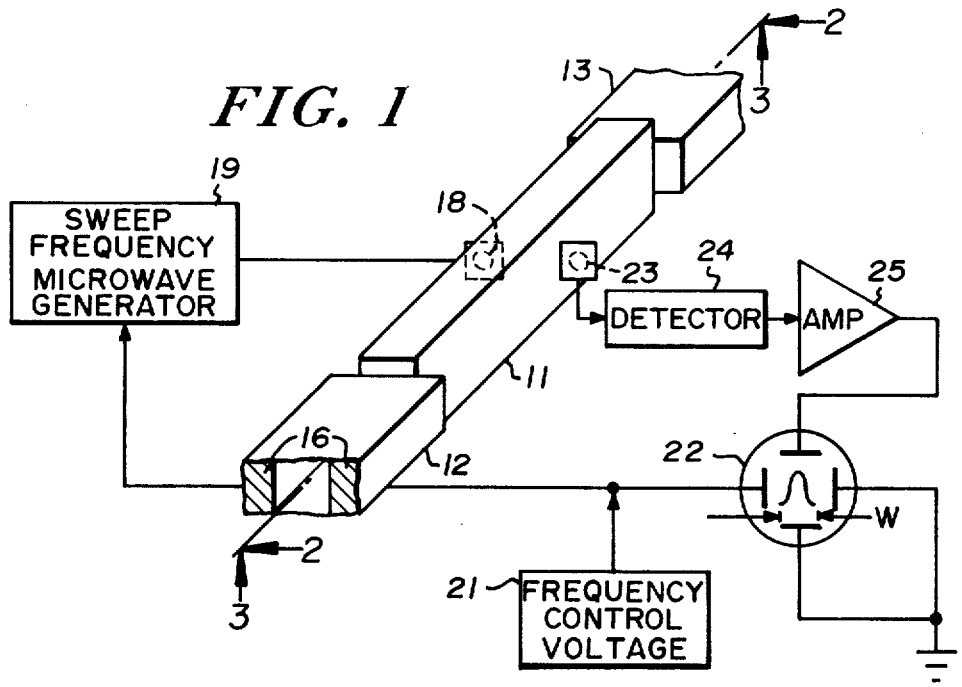
FIG. 1 is a perspective view of the microwave system incorporating features of the present invention.
Figure 2:
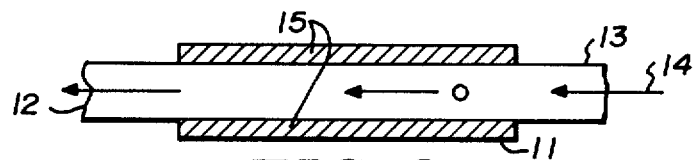
FIG. 2 is a cross-sectional view of the wave guide arrangement taken along the line 2—2 of FIG. 1.
Figure 3:
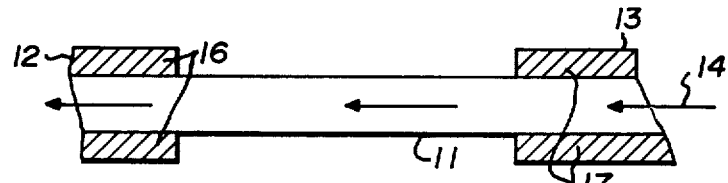
FIG. 3 is a cross-sectional view of the wave guide arrangement taken along the line 3—3 in FIG. 1.

With reference to FIG. 1, there is illustrated a microwave system which includes a resonant cavity 11 of rectangular configuration having at its terminal portions similarly dimensioned end pipes 12 and 13. The length of the resonant cavity is an integral number of half wave lengths of the resonant frequency to be employed. Each of the end pipes is mounted end-to-end with its respective terminal portion of the resonant cavity 11 and turned 90° with respect thereto, so as to effectively electrically close the resonant cavity at each of its terminal ends. With such a wave guide arrangement at the operating frequency chosen, the only allowable field patterns would be mutually perpendicular to each other at the junction so that one cannot excite the other. The result is that the generated electromagnetic field is confined to the region defined by the resonant cavity while allowing free entry and egress of a medium resulting in an electromagnetic field leak proof test chamber. This provides for a convenient feed path, as is denoted in FIGS. 2 and 3 by arrows 14, for passing the medium for monitoring and/or processing purposes in the resonant cavity.

To eliminate the bore discontinuities where the end pipes 12, 13 join the resonant cavity 11, slabs 15, 16 and 17, of suitable material, are inserted in the resonant cavity 11 and in the end pipes 12 and 13 to better define a central continuous feed path. The choice of slab material will be determined by the particular medium being transported. Thus, with slabs having a similar permittivity as the medium the microwave effect desired is only slightly reduced. Also, a low friction coefficient is desired in selecting the slab material.

A coupling aperture 18 in the side wall of the resonant cavity is used for feeding microwave power into the resonant cavity from a microwave generator unit 19 such as a klystron, diode or similar device. The frequency of unit 19 is controlled by a sweep frequency control voltage unit 21 which also drives the X-display on the cathode-ray oscilloscope 22 in synchronism with the microwave generator sweep frequency. By way of coupling aperture 23 an output signal is derived from the resonant cavity 11 whereby the strength of the resonance (as affected by the attenuation) determines the output signal strength and bandwidth. The output signal is fed to a detector 24, the output of which is employed to drive the spot of the cathode-ray oscilloscope 22 vertically via amplifier 25.

Due to changes in the dielectric properties within the resonant cavity, the resonant frequency of the cavity will change with temperature and humidity. Accordingly, for monitoring purposes, humidity and/or temperature of the medium passing through the resonant cavity can be ascertained with a high degree of sensitivity and accuracy. This is achieved by analyzing the position (i.e. frequency) and/or bandwidth of the resonant curve on the oscilloscope. In the preferred embodiment the change in bandwidth is representative of the microwave power losses and the change in frequency is representative of the instantaneous total weight of the content within the cavity. Once the fixed microwave losses have been evaluated (i.e. wall losses, stray losses and slab losses), the remaining losses are indicative of the humidity characteristic to be measured. Accuracy is assured when the resonant cavity is continuously maintained in a filled condition without air pockets as the medium is being passed through.

Figure 4:
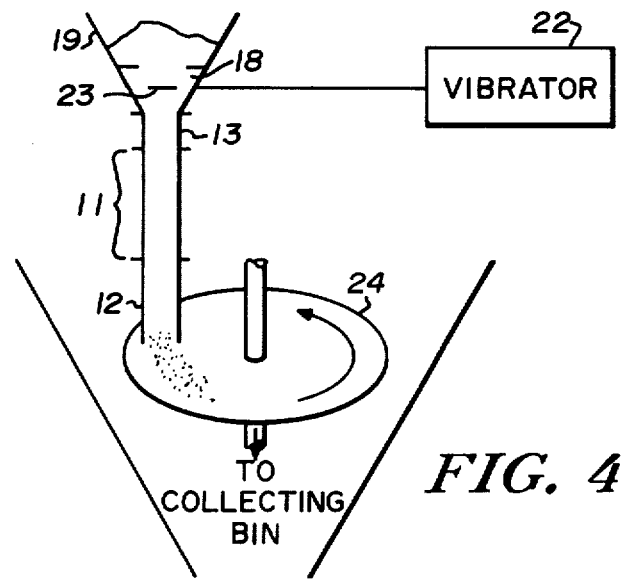
FIG. 4 is a schematic view of the microwave system integral with the feed operation for maintaining the resonant cavity continuously filled, incorporating features of the present invention.

In describing the operation of the present embodiment, reference will be made to FIG. 4 which describes the adaption to a particular material, i.e. abscorbic powder, which is being gravity fed through the resonant cavity and where it is desired to monitor the humidity or moisture content of the powder. As may be seen with reference to FIG. 4, the powder 18 is fed in a continuous flow system through the resonant cavity 11 and a funnel-shaped unit 19 which is connected to a vibrator unit 22 adjusted to give uniform powder flow. To supplement the above, stationary baffles 23 are also provided to further prevent clogging at the throat of the funnel.

The measurement of moisture content of humidity in the powder within the resonant cavity is determined from the received signal by ascertaining the magnitude of the loss from the microwave power introduced to the resonant cavity at the coupling aperture 18. The resonant cavity 11 becomes a resonant wave guide length for electromagnetic waves of a particular frequency (for example, 8,500 MHz in the present example) because the electric polarization at the end sections is such that energy cannot be propagated, due to the electrical closure effected by the 90° turned end pipes 12 and 13. The strength of the resonance, determined by the water in the powder, determines the signal strength and bandwidth at the output coupling hole 23. The overall measured loss, however, determined by the resonant bandwidth at CRT 22, in addition to the loss represented by the moisture content contains fixed losses which are subtracted with each measurement from the total losses, to determine that loss indicative of the moisture content within the powder.

To provide for accurate measurements, it is important that the resonant cavity 11 be kept filled with moving powder without air pockets which, due to their instability, would otherwise be difficult to compensate for. This is accomplished, as is shown in FIG. 4, by a slowly rotating disc 24, the upper surface of which is shown to be just adjacent to the outlet from the end pipe 12 so as to dispense the powder from the resonant cavity 11 in a controlled fashion to continuously maintain the resonant cavity in a filled condition in which the powder is never allowed to come to rest. The powder is then discharged from the surface of the rotating disc to a powder collection bin.

Because the chamber or resonant cavity 11 is subject to unpredictable variations in its filling, the resonant frequency is "jittery" and drifts. The jitters may be readily averaged out by taking separate measurements either manually or automatically many times per minute and the drift may be simply taken care of by adjusting the microwave frequency through conventional automatic circuitry.

An alternative feed arrangement to the above, would be in the case where in lieu of a powder a liquid would be fed through the resonant cavity. In this case, in order to maintain the resonant cavity in a constantly filled condition a valve might be inserted at the end pipe 12 and opened at regular frequent but short intervals to allow small amounts of the liquid through or have an opening for continuously allowing the liquid to be passed at a predetermined rate.

I claim:

1. A system in which microwave techniques are applied to a solid particulate medium having continuous flow in the system for exposing the medium to resonant electromagnetic energy comprising:

wave guide means for defining a substantially uniformed cross-sectioned continuous feed path including resonant cavity means and end pipe means at opposite ends of the resonant cavity means, each end pipe means being arranged relative to said resonant cavity means to electrically close one end of the resonant cavity means while maintaining said feed path mechanically unobstructed; and means coupled with said end pipe means for continuously maintaining said resonant cavity means filled with said medium.

2. A system according to claim 1 for measuring the medium for a particular characteristic including means for deriving from the resonant cavity means, an electrical resonance signal representative of the medium characteristic to be monitored.

3. A system according to claim 2 where the bandwidth of said electrical resonance signal is determinative of the medium characteristic to be measured.

4. A system according to claim 2 where said deriving means includes means for periodically sweeping said resonant cavity means and including:

means for ascertaining the position of said electrical resonance signal relative to each periodic sweep for determining the medium characteristic to be measured.

5. A system according to claim 2 wherein said resonant cavity means and end pipe means are rectangular wave guides having similar cross-section dimensions and said end pipe means being turned 90° with relation to said resonant cavity means.

6. A system according to claim 5 including elongated rectangular slab means inserted at opposite sides of said resonant cavity means and at least one of said end pipe means to provide a continuous uninterrupted feed path of uniform cross-section through said resonant cavity means and said end pipe means.

7. A system according to claim 2 where said means for continuously maintaining said resonant cavity means filled with said medium comprises:

feed means for continuously introducing said medium and dispensing from said resonant cavity means so as to maintain a uniform quantity of the medium within the resonant cavity means as the medium moves through.

8. A system according to claim 2 where the medium includes two or more components of different dielectric constants and it is desired to measure the weight at least of one of said components.

* * * * *